Patented June 24, 1947

2,423,042

UNITED STATES PATENT OFFICE 2,423,042

POLYMERIZABLE MIXED ESTER OF AN UNSATURATED POLYCARBOXYLIC ACID, PHTHALIC ACID, AND A LOWER ALIPHATIC GLYCOL

Irving E. Muskat, Plainfield, N. J., assignor to Marco Chemicals, Inc., Sewaren, N. J., a corporation of New Jersey No Drawing. Application November 17, 1943, Serial No. 510,664

7 Claims. (Cl. 260—75)

This invention relates to a new class of polymerizable mixed esters including new types of unsaturated alkyd resins. It is known that unsaturated dibasic acids may be reacted with dihydric alcohols to form resinous products which may be further polymerized to a thermosetting state by means of the unsaturated groups in the composition.

In preparation of unsaturated alkyd type resins from a lower aliphatic glycol such as monoethylene glycol, 1,2-propylene glycol, isobutylene glycol, or trimethylene glycol, the resulting products often crystallize on standing. This is particularly true of ethylene glycol alkyds, especially when the alkyds are blended with other polymerizable materials such as styrene, vinyl acetate, etc. This crystallization is objectionable since it prevents formation of an essentially homogeneous polymer upon polymerization.

The problem is even more acute when modified products are produced. For example, when an unsaturated alkyd formed by reaction of ethylene glycol and maleic anhydride is reacted with a monohydric alcohol to reduce the viscosity as described in a copending application of Charles Gould, Serial No. 491,657, filed June 21, 1943, the product crystallizes to a mush on standing for but a few days.

In accordance with the present invention, I have been able to produce readily polymerizable unsaturated mixed esters, many of which are unsaturated alkyd resins which do not crystallize or which crystallize to but a minor degree by reaction of a glycol such as ethylene glycol, 1,2-propylene glycol, 1,3-propylene glycol, 1,2-butylene glycol, isobutylene glycol, etc., with an unsaturated dibasic acid and 5 to 35 mole per cent of phthalic acid or anhydride based upon the moles of dibasic unsaturated acid. Often an unsaturated ester prepared by interaction of these agents or organic solutions of such an ester may be permitted to stand for long periods of time without crystallizing. Moreover, derivatives prepared therefrom by reaction with monohydric alcohols according to the application Serial No. 491,657, remain as liquids or as glass-like solids and do not crystallize to an objectionable extent. Where the composition contains 15 per cent or more of phthalic anhydride, little if any crystallization occurs within a period of one month.

The esters herein contemplated may be prepared by reacting a mixture of the monoglycol such as ethylene glycol, the unsaturated polybasic acid and the phthalic acid or anhydride at an elevated temperature, for example, 150 to 220° C. Acids or anhydrides such as maleic anhydride, fumaric acid, itaconic acid, acetylene dicarboxylic acid, mesaconic acid or citraconic acids may be used as the unsaturated polybasic acid. Similar esters may be prepared by partially reacting the glycol with the unsaturated polybasic acid and reacting the phthalic or anhydride with the reaction product after reaction with the unsaturated acid is partially or wholly complete. Alternatively, other esters may be prepared by reacting a mixture of glycol and phthalic acid or anhydride and thereafter reacting the product with the unsaturated polybasic acid.

The reaction may be conducted simply by heating a mixture of the reactants in a suitable reaction vessel. Where a product of good color is desired, the reaction should be conducted substantially in the absence of air. Carbon dioxide or other inert gas may bubble through the mixture in order to establish an essentially non-oxidizing atmosphere over the reaction mixture. If desired, polymerization inhibitors such as hydroquinone, phenol, cresol, etc., may be added to inhibit or prevent polymerization of the unsaturated groups. Often it is desired to use an inhibitor which may be topped off by heating the product in vacuo at an elevated temperature.

The proportions of glycol to dibasic acid may be varied to a considerable degree in accordance with the product desired. For example, the glycol and dibasic acid may be reacted in equimolecular quantities or the glycol or acid may be 10, 20 or 50 per cent in excess as desired. At all events, sufficient glycol and acid should be used to form a compound containing at least two unsaturated groups per molecule and capable of polymerizing to a thermohardened stage. For most cases about 0.5 to 1.5 moles, preferably not more than 1.05, of glycol is used per mole of dibasic acid.

The product may be modified by introduction of a monohydric alcohol such as methyl, ethyl, propyl, isopropyl, butyl, isobutyl, amyl, allyl, lauryl, hexyl, propargyl or methallyl alcohol into the reaction mixture either in the earlier or later stages of esterification. For example, the glycol and dibasic acids may be added and the mixture heated until the mixture goes into solution and has an acid number of 200 or more. The monohydric alcohol may be added at that time in proportion of 0.1 to one mole of monohydric alcohol per mole of glycol and the mixture heated under reflux until a resinous product is secured. Alternatively, the alcohol may be added initially, In like manner, the alkyd may be modified by incorporation of monobasic acids such as acetic, acrylic, propionic, methacrylic, crotonic, oleic, stearic or linoleic acids or China-wood oil acids or partial esters such as ethyl acid phthalate, ethyl acid maleate, allyl chloroformate, etc. These acids or acid esters may be introduced initially or after partial or complete production of the resin. Furthermore, both monobasic acids and monohydric alcohols may be incorporated into the same composition.

The reaction may be continued until the desired degree of interaction may be secured. For example, flowable liquid polymerizable materials may be prepared having an acid number of 200 or below, for example 100 to 200. These products when polymerized form hard polymers having water resistance somewhat poorer than that of polymers of products of lower acid number. Their hardness and water resistance may be improved by copolymerization with other materials including styrene, vinyl acetate, diallyl maleate, diallyl fumarate, succinate, etc.

Alternatively, the resin forming reaction may be continued to form resins having acid numbers of 50 or below if desired. The resins thus obtained are liquid to glassy solid resinous products. Thus the products having acid numbers of 150 to 200 are viscous liquids while the products of acid number of 100 or below are generally glassy solids or very viscous liquids. They are compatible with up to 30 percent by weight of vinyl acetate or styrene, and up to 60 or 70 percent by weight with esters of phthalic acid such as diallyl phthalate.

These resinous products may be polymerized by heat and/or light in the presence of catalysts such as benzoyl peroxide, lauroyl peroxide, ethyl peroxycarbonate, etc. Moreover, they may be co-polymerized with a wide variety of other polymerizable compositions such as glycerol phthalate alkyds, vinyl acetate, vinyl chloride, methyl methacrylate, methyl acrylate, allyl methacrylate, allyl esters of dibasic acids such as diallyl phthalate, diallyl maleate, diallyl fumarate, diallyl succinate, diallyl carbonate, diallyl adipate, diallyl azelate or the corresponding esters of methallyl propargyl or 2-chloroallyl alcohol or similar unsaturated alcohol.

The following examples are illustrative:

Example 1

409 grams of ethylene glycol, 588 grams of maleic anhydride and 89 grams of phthalic anhydride was placed in a flask and heated under an atmosphere of carbon dioxide at a temperature gradually rising from 150 to 186° C. over a period of 3 hours, and water evolved was distilled from the mixture. The product obtained was a viscous amber colored glass-like solid having an acid number of 119. This liquid did not crystallize appreciably on standing.

The liquid polymerized in the presence of 3 per cent by weight of benzoyl peroxide upon heating according to the following cycle:

16 hrs at 50° C.
1 hr. at 65° C.
2 hrs. at 70° C.
1 hr. at 75° C.
2 hrs. at 80° C.
1 hr. at 85° C.
1 hr. at 90° C.
0.5 hr. at 95° C.
1 hr. at 115° C.

to form a hard, brittle casting having a Barcol hardness of about 55.

A mixture of 80 parts by weight of the resin, 20 parts by weight of styrene and 1 part by weight of benzoyl peroxide polymerized on heating according to the above cycle to form an opaque polymer indicating incompatibility.

Upon polymerization of a mixture of 80 parts by weight of the resin, 20 parts by weight of vinyl acetate and 0.5 part by weight of benzoyl peroxide according to the above cycle, a clear hard co-polymer was obtained. When the vinyl acetate is increased to 40 parts by weight, an opaque incompatible co-polymer was obtained.

Diallyl phthalate forms compatible co-polymers with this resin in amounts over 40 percent by weight when polymerized in the presence of 3 percent benzoyl peroxide. Similar products of greater activity may be secured through use of fumaric acid in lieu of maleic anhydride.

Example 2

296 grams of phthalic anhydride, 1960 grams of maleic anhydride and 1360 grams of ethylene glycol were heated at a temperature gradually rising from 170 to 210° C. for 14 hours and a viscous liquid which cooled to a glassy solid was obtained. This solid had an acid number of about 30. It was soluble in vinyl acetate, styrene, diallyl maleate and diallyl phthalate and such solutions exhibited little tendency to crystallize. The product polymerized in the presence of 3 percent by weight of benzoyl peroxide on heating at 85° C. for two hours. A mixture containing 80 parts by weight of the alkyd, 20 parts by weight of styrene and 2 percent by weight of benzoyl peroxide polymerized on standing. Moreover, the product may be polymerized to form clear co-polymers with 20 percent by weight vinyl acetate, diallyl phthalate or diallyl adipate under the conditions set forth in Example 1.

Example 3

1568 grams of maleic anhydride, 592 grams of phthalic anhydride, 1240 grams of ethylene glycol, and 3.4 grams of hydroquinone were placed in a flask equipped with a stirrer. The mixture was heated in an oil bath to a temperature gradually rising from 180 to 215° C. over a period of 3½ hours. During heating a stream of carbon dioxide was bubbled through the reaction mixture and water evolved was vaporized. The product was a clear, sticky mass at room temperature having an acid number of about 90. No crystal formation occurred when this resin was allowed to stand for a period of one week. The resin can be polymerized as in Example 1 to form somewhat softer, less water resistant polymers. A similar product is obtained when propylene glycol is used in lieu of ethylene glycol.

Example 4

The process of Example 2 was repeated using 1750 grams of fumaric acid in lieu of the maleic anhydride. A sticky glass-like product containing no crystals and which had an acid number of 20 and which was otherwise similar to that obtained in Example 2 was secured. This product polymerized more readily than the product of Example 2 and required less peroxide. Itaconic acid may be used in lieu of fumaric acid in this process.

Although the present invention has been described with particular reference to the details of specific embodiments thereof, it is not intended that such details shall be regarded as limitations upon the scope of the invention except insofar as included in the accompanying claims. The term "acid" in the accompanying claims is intended to include the corresponding anhydride of such acid. The expression "a lower aliphatic glycol having the hydroxyl groups connected by a straight, saturated hydrocarbon chain of no more than three carbon atoms," as used in one of the claims, is not to be construed as excluding glycols having a branched hydrocarbon chain between the hydroxyl groups such as isobutylene glycol, for example.

I claim:

1. The polymerizable mixed ester of an unsaturated, alpha beta polycarboxylic acid and about 0.05 to 0.35 mole of phthalic acid and about 0.5 to 1.5 moles of ethylene glycol per mole of said unsaturated acid.

2. The polymerizable mixed ester of maleic acid and about 0.05 to 0.35 mole of phthalic acid and about 0.5 to 1.5 moles of ethylene glycol per mole of maleic acid.

3. The polymerizable mixed ester of an unsaturated alpha beta polycarboxylic acid and about 0.05 to 0.35 mole of phthalic acid and about 0.5 to 1.5 moles of a lower aliphatic glycol having the hydroxyl groups connected by a straight, saturated hydrocarbon chain of no more than three carbon atoms per mole of said unsaturated acid.

4. A method which comprises heating the mixture of ethylene glycol, maleic acid and phthalic acid, in proportions of about 0.5 to 1.5 moles of ethylene glycol and about 0.05 to 0.35 mole of phthalic acid per mole of maleic acid, to esterify the same and produce a polymerizable product.

5. A method which comprises heating the mixture of ethylene glycol, an unsaturated alpha beta polycarboxylic acid and phthalic acid, in proportions of about 0.5 to 1.5 moles of ethylene glycol and about 0.05 to 0.35 mole of phthalic acid per mole of said unsaturated acid, to esterify the same and produce a polymerizable product.

6. The polymer of the mixed ester of an unsaturated alpha beta polycarboxylic acid and about 0.05 to 0.35 mole of phthalic acid and about 0.5 to 1.5 moles of ethylene glycol per mole of said unsaturated acid.

7. The polymer of the mixed ester of maleic acid and about 0.05 to 0.35 mole of phthalic acid and about 0.5 to 1.5 moles of ethylene glycol per mole of said unsaturated acid.

IRVING E. MUSKAT.

REFERENCES CITED

The following references are of record in the file of this patent:

UNITED STATES PATENTS

| Number | Name | Date |
| --- | --- | --- |
| 2,195,362 | Ellis | Mar. 26, 1940 |
| 2,255,313 | Ellis | Sept. 9, 1941 |
| 2,319,799 | D'Alelio | May 25, 1943 |

FOREIGN PATENTS

| Number | Country | Date |
| --- | --- | --- |
| 540,168 | Great Britain | Oct. 8, 1941 |

OTHER REFERENCES

Carother's Collected Papers, pub. by Interscience Publishers, N. Y., 1940, pages 23-24.